(12) United States Patent
Ueda

(10) Patent No.: US 10,719,004 B2
(45) Date of Patent: Jul. 21, 2020

(54) DOME SCREEN

(71) Applicant: Konica Minolta Planetarium Co., Ltd., Tokyo (JP)

(72) Inventor: Hiroaki Ueda, Suita (JP)

(73) Assignee: Konica Minolta Planetarium Co., Ltd., Tokyo (JP)

( * ) Notice: Subject to any disclaimer, the term of this patent is extended or adjusted under 35 U.S.C. 154(b) by 0 days.

(21) Appl. No.: 16/464,308

(22) PCT Filed: Oct. 5, 2017

(86) PCT No.: PCT/JP2017/036377
§ 371 (c)(1),
(2) Date: May 28, 2019

(87) PCT Pub. No.: WO2018/100880
PCT Pub. Date: Jun. 7, 2018

(65) Prior Publication Data
US 2019/0384154 A1    Dec. 19, 2019

(30) Foreign Application Priority Data
Nov. 26, 2016 (JP) .................................. 2016-231782

(51) Int. Cl.
*G03B 21/60* (2014.01)
*H04R 1/02* (2006.01)
(Continued)

(52) U.S. Cl.
CPC ............ *G03B 21/60* (2013.01); *G02B 5/045* (2013.01); *G03B 21/56* (2013.01); *G03B 21/602* (2013.01); *G03B 21/625* (2013.01); *H04R 1/02* (2013.01)

(58) Field of Classification Search
CPC .... G03B 21/625; G03B 21/60; G03B 21/602; G03B 21/56; G02B 5/045
(Continued)

(56) References Cited

U.S. PATENT DOCUMENTS 469,472 A * 2/1892 Hammerstein ........... E04H 3/12
52/8
2,273,074 A * 2/1942 Waller ................... G03B 21/56
359/451
(Continued)

FOREIGN PATENT DOCUMENTS

JP         2566062 B2    12/1996
JP       2002148719  *   5/2002 ............... G02B 5/02
(Continued)

OTHER PUBLICATIONS

International Search Report dated Jan. 23, 2018 filed in PCT/JP2017/036377.
(Continued)

*Primary Examiner* — Clayton E. LaBalle
*Assistant Examiner* — Kevin C Butler
(74) *Attorney, Agent, or Firm* — Rankin, Hill & Clark LLP

(57) ABSTRACT

A dome screen for preventing generation of a missing part of a star projected on the dome screen is provided. A dome screen 10 capable of projecting an image includes a dome portion 11 and a sheet portion 12. The dome portion 11 has a plurality of holes and is formed in a hemispherical shape. The sheet portion 12 is arranged on an outer side of the dome portion 11 so as to overlap with the dome portion 11 and has light reflectivity.

19 Claims, 5 Drawing Sheets

(51) Int. Cl.
 *G02B 5/04* (2006.01)
 *G03B 21/625* (2014.01)
 *G03B 21/602* (2014.01)
 *G03B 21/56* (2006.01)

(58) Field of Classification Search
 USPC .................................................. 359/454, 460
 See application file for complete search history.

(56) References Cited

U.S. PATENT DOCUMENTS

| | | | | |
|---|---|---|---|---|
| 2,690,185 A * | 9/1954 | Pomykala | ............ | E04B 1/3211 135/137 |
| 2,900,870 A * | 8/1959 | Jackson | ................ | G03B 21/56 359/451 |
| 3,139,957 A * | 7/1964 | Fuller | ..................... | E04B 1/32 52/83 |
| 3,325,958 A * | 6/1967 | Moore | ................... | E04B 7/105 52/647 |
| 3,768,218 A * | 10/1973 | Blaski | ................... | E04B 1/3211 52/81.5 |
| 3,776,621 A * | 12/1973 | Worland | ............... | G02B 27/06 352/85 |
| 3,925,940 A * | 12/1975 | O'Connell, Jr. | ...... | E04B 1/3211 52/81.1 |
| 3,992,841 A * | 11/1976 | Ward, Jr. | ............. | E04B 1/3211 52/309.9 |
| 3,999,336 A * | 12/1976 | Bance | ................... | E04B 1/3211 52/81.3 |
| 4,301,627 A * | 11/1981 | Wilson | .................... | E04G 5/14 182/113 |
| 4,464,029 A * | 8/1984 | Jaulmes | ................. | G09B 9/304 352/132 |
| 4,473,355 A * | 9/1984 | Pongratz | ................. | G09B 9/32 359/451 |
| 4,491,437 A * | 1/1985 | Schwartz | ............. | E04B 1/3211 403/172 |
| 4,514,347 A * | 4/1985 | Reed | ....................... | E04B 1/164 264/162 |
| 4,642,945 A * | 2/1987 | Browning | ............... | A63J 25/00 352/36 |
| 4,736,553 A * | 4/1988 | Geiger | ..................... | E04B 7/14 135/908 |
| 4,885,878 A * | 12/1989 | Wuu | ......................... | E04H 3/126 52/6 |
| 5,011,263 A | 4/1991 | Hopper | | |
| 5,067,288 A * | 11/1991 | Takahanna | ........... | E04B 1/3211 52/81.2 |
| 5,097,640 A * | 3/1992 | Skolnick | ............... | E04B 1/3211 434/286 |
| 5,170,599 A * | 12/1992 | Knight | ................... | E04B 1/3211 52/91.1 |
| 5,179,440 A * | 1/1993 | Loban | .................... | G03B 21/56 348/36 |
| 5,371,983 A * | 12/1994 | Kawaguchi | ........... | E04B 1/3211 52/223.8 |
| 5,541,769 A * | 7/1996 | Ansley | ................... | G03B 21/56 359/443 |
| 5,611,174 A * | 3/1997 | Hayashi | ................ | G09B 9/323 52/8 |
| 5,649,827 A * | 7/1997 | Suzaki | .................... | G09B 27/02 353/28 |
| 5,715,854 A * | 2/1998 | Andrieux | ............... | E04H 15/001 135/94 |
| 5,724,775 A * | 3/1998 | Zobel, Jr. | .............. | E04B 1/3211 359/443 |
| 5,857,294 A * | 1/1999 | Castro | ..................... | E04B 7/105 52/6 |
| 6,176,584 B1 * | 1/2001 | Best | ......................... | G09F 19/18 353/30 |
| 6,253,494 B1 * | 7/2001 | Shaffron | ................... | E04H 3/22 52/64 |
| 6,282,842 B1 * | 9/2001 | Simens | ................... | E04H 15/20 52/1 |
| 6,499,846 B1 * | 12/2002 | Hiller | ...................... | G09B 27/02 353/50 |
| 6,665,985 B1 * | 12/2003 | Hennes | .................... | E04H 3/22 352/69 |
| 6,909,543 B2 * | 6/2005 | Lantz | .................... | G03B 21/00 348/36 |
| 10,189,585 B2 * | 1/2019 | Takeuchi | ............. | H04N 9/3179 |
| 10,288,995 B2 * | 5/2019 | De Meerleer | ......... | G02B 13/06 |
| 10,423,059 B2 * | 9/2019 | Nashida | ................. | G03B 21/10 |
| 2002/0131018 A1* | 9/2002 | Lucas | .................... | G03B 21/56 352/85 |
| 2005/0275813 A1* | 12/2005 | Yamazaki | ............... | G03B 21/13 353/94 |
| 2006/0139579 A1* | 6/2006 | Kasahara | ............... | G03B 21/14 353/94 |
| 2009/0066858 A1* | 3/2009 | Turner | .................... | G03B 21/56 348/744 |
| 2010/0220296 A1* | 9/2010 | DePoar | ................. | G03B 21/00 353/30 |
| 2010/0300006 A1* | 12/2010 | Magpuri | ................... | E04H 3/22 52/8 |
| 2011/0170074 A1* | 7/2011 | Ferren | .................... | G03B 21/56 353/94 |
| 2011/0249330 A1* | 10/2011 | Anderson | ................ | E04H 3/22 359/460 |
| 2012/0287407 A1* | 11/2012 | De Paor | .................. | G03B 21/56 353/30 |

FOREIGN PATENT DOCUMENTS

| | | | | |
|---|---|---|---|---|
| JP | 2002148719 A | | 5/2002 | |
| JP | 2008107536 | * | 5/2008 | ............ G03B 21/00 |
| JP | 2008107536 A | | 5/2008 | |

OTHER PUBLICATIONS

Written Opinion of the International Searching Authority (Form PCT/ISA/237) dated Jan. 23, 2018 filed in PCT/JP2017/036377; English translation.

* cited by examiner

FIRST COMPARATIVE EXAMPLE

SECOND COMPARATIVE EXAMPLE

FIRST EXAMPLE

SECOND COMPARATIVE EXAMPLE

FIRST EXAMPLE

DOME SCREEN

TECHNICAL FIELD

The present invention relates to a dome screen.

BACKGROUND ART

Conventionally, screens made of various materials and having various specifications have been proposed as a dome-type screen (dome screen) used for a planetarium and the like. For example, Patent Literature 1 discloses an aluminum perforated screen having a plurality of through-holes.

CITATION LIST

Patent Literature

Patent Literature 1: JP 2566062 B

SUMMARY OF INVENTION

Technical Problem

However, the perforated dome screen disclosed in Patent Literature 1 can output voice and the like through holes from the rear side of the screen. However, an image overlapped on the position of the hole is missing in the hole. Particularly, in a case where the perforated screen is used for a planetarium projecting small starts, an effect of the missing image increases. This is because, while a screen having a hole diameter of about 1.5 to 2.0 mm is used as a standard perforated dome screen, there is a case where a diameter of the smallest star that is projected is less than one mm. Therefore, there is a case where the small star completely overlaps within a range of the hole. In this case, a problem occurs such that the star cannot be visually recognized. Furthermore, in a case where a part of the star overlaps with the hole, the star is not completely missing. However, since a light amount of the entire star is reduced, a problem occurs such that brightness of the star is lowered.

The present invention has been made in consideration of the above circumstances, and provides a dome screen that prevents a missing part of a star projected on the dome screen from being generated.

Solution to Problem

The object of the present invention is achieved by the following methods.

(1) A dome screen capable of projecting an image, the dome screen includes a dome portion having a plurality of holes and formed in a hemispherical shape and a sheet portion arranged on an outer side of the dome portion so as to overlap with the dome portion, and having light reflectivity.

(2) The dome screen according to (1), in which an aperture ratio of the plurality of holes is selected so that a sound transmission loss indicating a loss of acoustic energy passing through the dome screen from an outer side to an inner side is equal to or less than a predetermined threshold.

(3) The dome screen according to (1), in which an aperture ratio of the plurality of holes and a material of the sheet portion are selected so that a sound transmission loss indicating a loss of acoustic energy passing through the dome screen from an outer side to an inner side is equal to or less than a predetermined threshold.

(4) The dome screen according to any one of (1) to (3), in which a ratio of a hole diameter of each of the plurality of holes and a thickness of the dome portion is selected so that a portion of the image equal to or more than a predetermined proportion projected on the sheet portion positioned on a bottom surface of the hole can be seen.

(5) The dome screen according to any one of (1) to (4), in which a hole diameter of each of the plurality of holes is selected so that a portion of the image equal to or more than a predetermined proportion projected on the sheet portion positioned on a bottom surface of the hole can be seen.

(6) The dome screen according to (5), in which an interval between the plurality of holes is determined based on the aperture ratio and the hole diameter selected so that the sound transmission loss indicating the loss of the acoustic energy passing through the dome screen from the outer side to the inner side is equal to or less than the predetermined threshold.

Advantageous Effects of Invention

A dome screen includes a dome portion that has a plurality of holes and is formed in a hemispherical shape and a sheet portion that is arranged on an outer side of the dome portion so as to overlap with the dome portion. Therefore, since the dome screen can reflect light of an image that enters a position of the hole by the sheet portion, the dome screen can display a uniform image without generating a missing part of the image.

DESCRIPTION OF EMBODIMENTS

Figure 1:
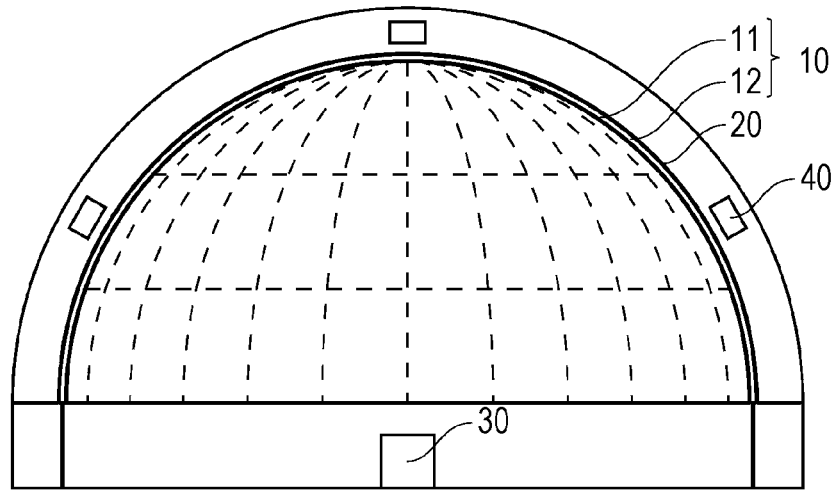
FIG. 1 is a cross-sectional diagram of a schematic configuration of a dome screen according to an embodiment of the present invention.

Hereinafter, an embodiment of the present invention will be described with reference to the accompanying drawings. In the description on the drawings, the same component is denoted with the same reference numeral, and overlapped description will be omitted. Furthermore, dimensional ratios of the drawings are exaggerated for convenience of description, and may be different from an actual ratio.

FIG. 1 is a cross-sectional diagram of a schematic configuration of a dome screen according to an embodiment of the present invention.

As illustrated in FIG. 1, a dome screen projection facility 1 includes a dome screen 10, a support frame 20, a projector 30, and a speaker 40.

The dome screen 10 is a screen on which an image can be projected. The dome screen 10 according to the present embodiment includes a dome portion 11 and a sheet portion 12.

The dome portion 11 has a plurality of holes and is a member formed in a hemispherical shape. The plurality of holes in the dome portion 11 is evenly arranged, for example, in a triangle lattice pattern or a square lattice pattern. Alternatively, the plurality of holes may be randomly arranged. For example, the dome portion 11 may be formed in a hemispherical shape by attaching a plurality of trapezoidal plate members to the support frame 20 to be described later. The dome portion 11 may be formed of metal such as aluminum and the like painted white, gray, and the like. However, the material of the dome portion 11 is not limited to this. Specifications of the plurality of holes of the dome portion 11, the material of the dome portion 11, and the like may be arbitrarily changed based on design conditions. The dome portion 11 may have a light reflectance of, for example, equal to or more than about 30%, more specifically, about 40 to 60%.

The sheet portion 12 is a sheet-like member that is arranged on the outer side of the dome portion 11 so as to overlap with the dome portion 11 and has light reflectivity. The sheet portion 12 is bonded to the outer side of the dome portion 11 with an adhesive, a double-faced tape, or the like. The sheet portion 12 may be formed of a polyester woven fabric, a nonwoven fabric, a resin sheet, a paper sheet, or the like that is white or gray. However, the material of the sheet portion 12 is not limited to these. It is desirable that the sheet portion 12 have a light reflectance about equal to that of the dome portion 11. Accordingly, the sheet portion 12 may have a light reflectance of, for example, equal to or more than about 30%, more specifically, about 40 to 60%. The sheet portion 12 may be bonded to each of the plurality of plate members forming the dome portion 11.

Here, "the outer side of the dome portion 11" means the outer side of the hemisphere formed by the dome portion 11, that is, the side where the support frame 20 and the speaker 40 are provided in FIG. 1. Furthermore, "the inner side of the dome portion 11" means the inner side of the hemisphere formed by the dome portion 11, that is, the side where the projector 30 is provided in FIG. 1. In addition, "the outer side of the dome screen 10" means the outer side of the hemisphere formed by the dome screen 10 including the dome portion 11 and the sheet portion 12, and "the inner side of the dome screen 10" means the inner side of the hemisphere formed by the dome screen 10.

The support frame 20 is a support member for supporting the structure of the dome screen 10. The support frame 20 includes a plurality of support members radially extending from the vertex of the hemisphere toward the lower end. The plurality of plate members forming the dome portion 11 may be attached to the support frame 20 with rivets, bolts, and the like after the sheet portion 12 is bonded to the plate members. That is, the support frame 20 is arranged on the outer side of the dome screen 10 including the dome portion 11 and the sheet portion 12, and the sheet portion 12 is arranged between the dome portion 11 and the support frame 20.

The projector 30 is a device that projects an image including a video. The projector 30 is installed on the inner side of the dome screen 10 as illustrated in FIG. 1 and projects an image on the dome screen 10. The installation place and the number of the projectors 30 are not limited to the example illustrated in FIG. 1 and may be arbitrarily changed based on the design conditions of the dome screen projection facility 1.

The speaker 40 is a device that outputs sound. As illustrated in FIG. 1, the plurality of speakers 40 is arranged on the outer side of the dome screen 10. Sound, music, and the like output from the speaker 40 are transmitted through the plurality of holes of the dome portion 11 and the sheet portion 12 and may be listened inside the dome screen 10. The installation place and the number of speakers 40 are not limited to the example illustrated in FIG. 1 and may be arbitrarily changed based on the design conditions of the dome screen projection facility 1. For example, a speaker (woofer) that outputs sound (bass) in a low frequency band and with low directivity may be installed on the inner side of the dome screen 10. Furthermore, a plurality of speakers that outputs sound (high tone) in a high frequency band and with high directivity may be installed on the outer side of the dome screen 10 as the speakers 40 illustrated in FIG. 1.

In this way, the dome screen 10 according to the present embodiment is characterized by combining the dome portion 11 and the sheet portion 12. The dome screen 10 reflects light, that is projected from the projector 30 and enters at a position other than the hole in the dome portion 11, on the dome portion 11 and reflects light, that enters the position of the hole, on the sheet portion 12. To uniform the light reflectance of the entire dome screen 10, it is desirable that the dome portion 11 and the sheet portion 12 have substantially the same light reflectance.

As described above, the dome screen 10 includes the dome portion 11 that has the plurality of holes and is formed in a hemispherical shape and the sheet portion 12 that is arranged on the outer side of the dome portion 11 so as to overlap with the dome portion 11. Therefore, since the dome screen 10 can reflect the light of the image that enters the position of the hole by the sheet portion 12, the dome screen 10 can display a uniform image without generating a missing part of the image.

Furthermore, since the dome screen 10 includes the sheet portion 12, the image is not partially missing regardless of the specification of the hole. Therefore, the dome screen 10 can has an aperture ratio larger than that of a conventional perforated screen. Therefore, regarding the dome screen 10, a weight of a member forming the dome portion 11 can be reduced, and the support frame 20 for supporting the dome screen 10 can be thinned, and in addition, a material cost and labor for construction can be reduced.

Furthermore, since the dome screen 10 can have the aperture ratio larger than the conventional dome screen, the plate member can be more easily bent when the plate member forming the dome portion 11 is attached to the support frame 20. Furthermore, even in a case where the plate member is bent in advance, processing for bending can be more easily performed, and processing accuracy may be improved.

In addition, since the dome screen 10 can have the aperture ratio larger than the conventional dome screen, the sound output by the speaker 40 installed on the outer side of the dome screen 10 can be transmitted to the inner side without being inferior to the conventional dome screen even when the sheet portion 12 is provided.

The dome screen 10 is formed by combining the dome portion 11 and the sheet portion 12. Therefore, the dome screen 10 can avoid not only a problem of the missing part of the star that is generated when only the dome portion 11 is used as a screen but also a problem that occurs when only the sheet portion 12 is used as a screen. That is, since the sheet portion 12 has a flexible structure, the dome screen 10 can avoid problems in that it is difficult for the single component to maintain a hemispherical shape and that contamination is more conspicuous in comparison with a metal screen.

In the above embodiment, an example of the configuration of the dome screen 10 has been described. However, the present embodiment is not limited to this. The following modifications and improvements can be made.

In the embodiment, it has been described that the sheet portion 12 can display the image. On the other hand, the material of the sheet portion 12 may be selected so that the sheet portion 12 can reflect the light and also transmit the light to some extent. In a case where the sheet portion 12 transmits light, it is possible to move indirect illumination (not shown) that is normally installed on the inner side of the dome screen 10 to the outer side of the dome screen 10 and illuminate the inner side of the dome screen 10. With this configuration, the dome screen projection facility 1 does not need to secure a space where the indirect illumination is installed on the inner side of the dome screen 10, and a space on the outer side of the dome screen 10 can be efficiently used. Furthermore, illumination on the outer side of the dome screen 10 may be realized by arranging LEDs at positions of at least some holes of the dome screen 10. The LEDs may be arranged on the rear surface of the sheet portion 12 and may be replaced with the sheet portion 12 in accordance with the positions of the holes of the dome portion 11. In a case where the LED is replaced with the sheet portion 12, it is desirable to cover the LED with a milky cap and the like so as to reflect the light of the image projected at the position of the hole.

Furthermore, the configuration including the perforated screen having the plurality of holes and the sheet portion may be used for a normal screen that is not hemispherical. For example, the configuration including the perforated screen and the sheet portion may be used for a normal screen installed in a movie theater and the like.

Subsequently, in the following description, a hole diameter of each of the plurality of holes included in the dome screen 10 according to the present embodiment will be discussed.

(Discussion of Hole Diameter)

Although the dome screen 10 has the plurality of holes, if the hole diameter is too large, there is a possibility that the hemispherical shape cannot be maintained due to drooping cloth in the holes. In addition, if the hole diameter is too large, a problem may occur such that the outer side of the dome screen 10 including the support frame 20, a joint of the dome portion 11, and the like can be easily seen through the hole. Therefore, to avoid these problems, the hole diameter of the dome portion 11 may be selected, for example, to be equal to or less than 10 mm. The maximum value of the hole diameter of the dome portion 11 is not limited to this, and may be, for example, 15 mm or 20 mm.

On the other hand, if the hole diameter is too small, a problem occurs such that the star projected on the sheet portion 12 cannot be seen. This problem will be described in detail below.

Figure 2:
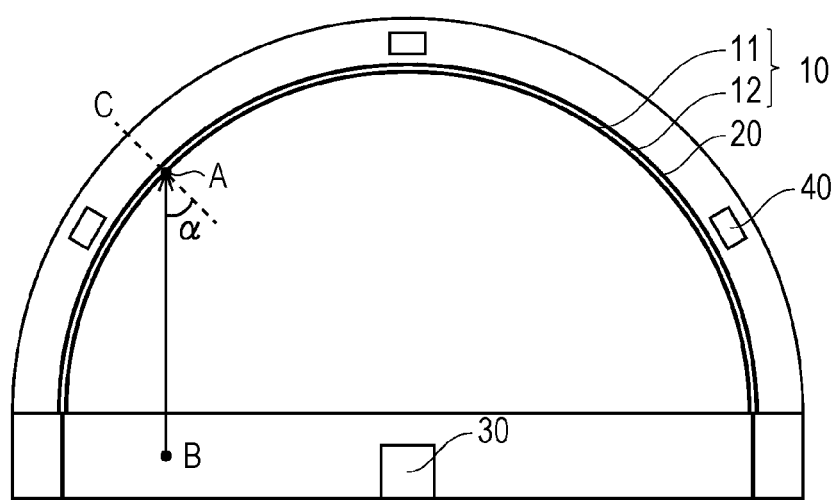
FIG. 2 is diagram for explaining an anticipated angle with respect to the dome screen.
Figure 3:
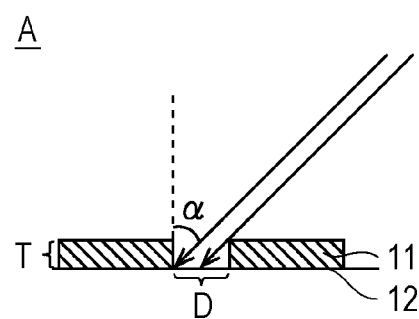
FIG. 3 is an enlarged view of a position A in FIG. 2.

FIG. 2 is diagram for explaining an anticipated angle with respect to the dome screen. FIG. 3 is an enlarged view of a position A in FIG. 2.

As illustrated in FIG. 2, a case is assumed where the hole is provided at the position A, the star is projected by the projector 30 at the position of the hole, and the star is viewed from a position B. In this case, from the position B, the star is viewed with a certain angle (referred to as "anticipated angle" below) α with respect to a perpendicular C of a dome surface. In this way, in a case where the star at an arbitrary screen position is viewed from an arbitrary seat position, the position of the star has the anticipated angle α.

However, as illustrated in FIG. 3, depending on the anticipated angle α and a ratio T/D of a hole diameter D relative to a thickness T of the dome portion 11, there is a case where a bottom surface of the hole at the position A (that is the sheet portion 12 positioned at the position A) cannot be seen at all. In the example illustrated in FIG. 3, a state is illustrated in which the bottom surface of the hole of the width between two arrows can be seen in a case where the bottom surface of the hole is viewed from a start point of an arrow. However, for example, it can be found that the proportion of the bottom area of the hole that can be seen is reduced if the anticipated angle α increases or the thickness T increases (that is, ratio T/D increases). When the bottom surface of the hole cannot be seen, even when the star is projected on the sheet portion 12 positioned on the bottom surface of the hole by using the sheet portion 12, the effect against the missing star cannot be realized. Therefore, it is important to appropriately select the ratio T/D in consideration of the anticipated angle α.

Table 1 indicates an example in which the proportion of the bottom area of the hole that can be seen is calculated based on the relation between the anticipated angle α and the ratio T/D.

TABLE 1

| Proportion of bottom area that can be visually recognized | | Ratio T/D | | | | | | |
|---|---|---|---|---|---|---|---|---|
| | | 0.125 | 0.2 | 0.3 | 0.4 | 0.533 | 0.633 | 1 |
| Anticipated angle α | 0 | 100% | 100% | 100% | 100% | 100% | 100% | 100% |
| | 5 | 99% | 98% | 97% | 96% | 94% | 93% | 89% |
| | 10 | 97% | 96% | 93% | 91% | 88% | 86% | 78% |
| | 15 | 96% | 93% | 90% | 86% | 82% | 79% | 66% |
| | 20 | 94% | 91% | 86% | 82% | 75% | 71% | 55% |
| | 25 | 93% | 88% | 82% | 76% | 69% | 63% | 43% |
| | 30 | 91% | 85% | 78% | 71% | 61% | 55% | 31% |
| | 35 | 89% | 82% | 73% | 65% | 54% | 45% | 19% |
| | 40 | 87% | 79% | 68% | 58% | 45% | 36% | 8% |
| | 45 | 84% | 75% | 62% | 50% | 35% | 25% | 0% |

Referring to Table 1, as described above, it can be confirmed that as the anticipated angle α is smaller and/or as the ratio T/D is smaller, the proportion of the bottom area of the hole that can be seen is larger. Furthermore, at least the ratio T/D is equal to or less than 0.4, the proportion of the bottom area of the hole that can be seen, that is 50%, can be secured even under strict conditions such as α=45 degrees.

The ratio T/D may be selected so that a portion an image equal to or more than a predetermined proportion projected on the sheet portion 12 positioned on the bottom surface of the hole can be seen based on the relation exemplified in Table 1. For example, the hole diameter D and the thickness T of the dome portion 11 may be selected so that the ratio T/D is equal to or less than 0.4 and so that at least equal to or more than 50% of the star projected on the bottom surface of the hole can be seen.

In addition, to achieve the desired ratio T/D, at least one of the hole diameter D and the thickness T may be adjusted. In a case where the thickness T cannot be easily changed, it is preferable to change only the hole diameter D. For example, if the thickness T of the dome portion 11 is one mm, it is preferable to select the hole diameter D equal to or more than 2.5 mm so that at least equal to or more than 50% of the star projected on the bottom surface of the hole can be seen. The anticipated angle α may be examined while setting an appropriate range based on the seat arrangement in the dome screen 10, the size of the dome screen 10, and the like.

Therefore, according to these discussion regarding the hole diameter, an appropriate range can be set for the hole diameter of the dome screen 10 according to the present embodiment.

Hereinafter, in addition, an effect of the dome screen 10 according to the present embodiment will be confirmed by comparing an example including the sheet portion 12 with a comparative example that does not include the sheet portion 12.

(Confirmation of Effect on Missing Star)

The effect against the missing star of the dome screen 10 according to the present embodiment has been confirmed.

First, as a screen of a first comparative example, a perforated aluminum plate (aluminum punching panel) that is painted white and has a thickness of 0.6 mm is prepared. The screen of the first comparative example has a plurality of holes arranged in a triangle lattice pattern, a hole diameter is 1.5 mm, an interval (pitch) between the holes is four mm, and an aperture ratio of the holes (pore ratio) is 13%. Specifications of the screen of the first comparative example correspond to specifications of a standard perforated dome screen that has been conventionally used for a planetarium and the like.

In addition, as a screen of a second comparative example, an aluminum punching panel that is painted white and has a thickness of one mm is prepared. The screen of the second comparative example has a plurality of holes arranged in a triangle lattice pattern, a hole diameter is five mm, an interval (pitch) between the holes is eight mm, and an aperture ratio of the holes is 35%. To easily confirm the missing state of the stars, the screen having the hole diameter and the aperture ratio larger than those of the screen of the first comparative example is prepared as the screen of the second comparative example.

Furthermore, as a screen of a first example, a screen to which polyester cloth is bonded on the rear surface side (opposite to side on which image is projected) of the screen of the second comparative example is prepared.

On the screens of the first comparative example, the second comparative example, and the first example, Orion's Belt is projected by an optical projector using an original of Orion from a position about four m away.

Figure 4:
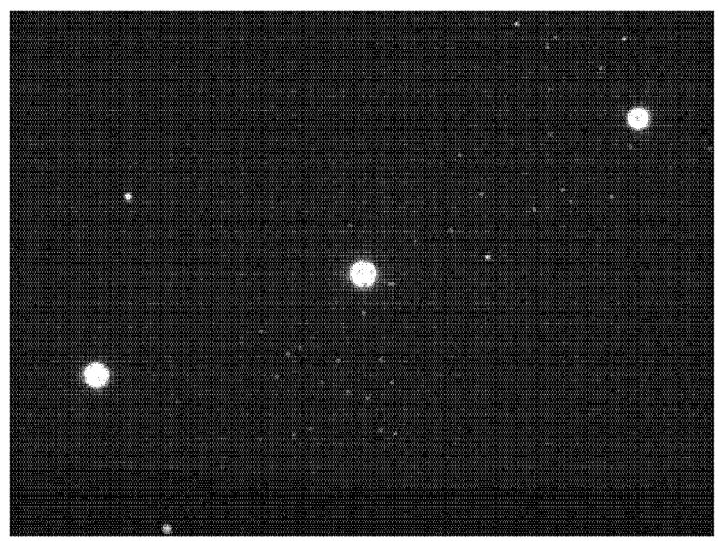
FIG. 4 is a photograph of stars projected on a screen according to a first comparative example.
Figure 5:
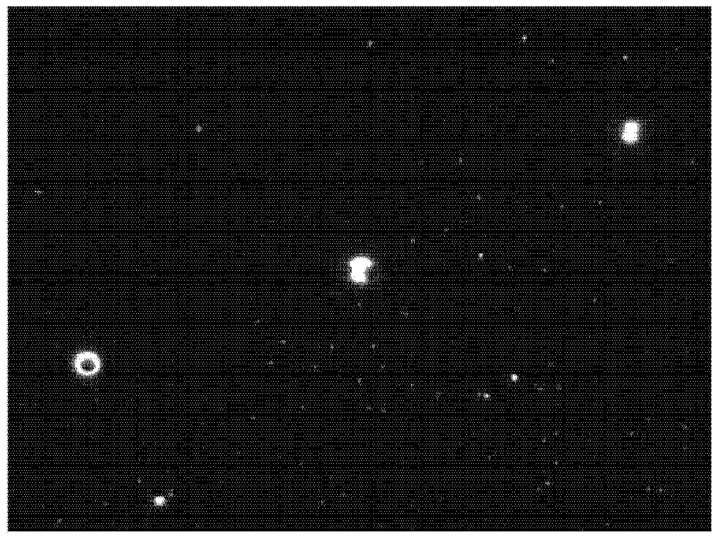
FIG. 5 is a photograph of stars projected on a screen according to a second comparative example.
Figure 6:
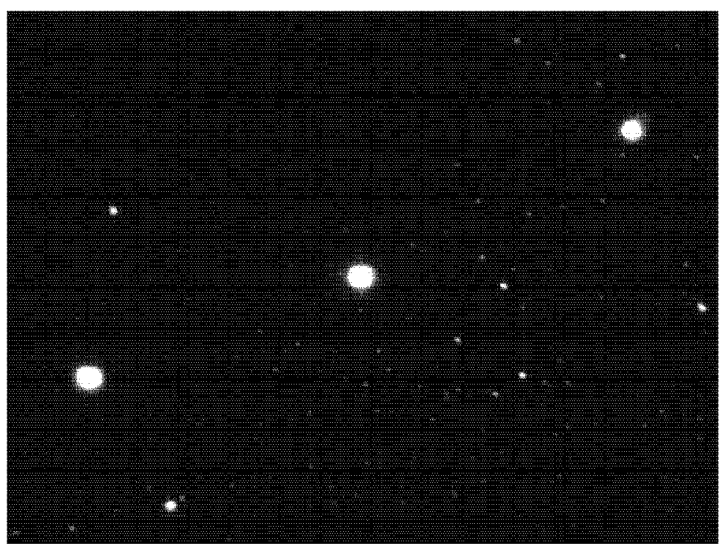
FIG. 6 is a photograph of stars projected on a screen according to a first example.

FIG. 4 is a photograph of the stars projected on the screen according to the first comparative example. FIG. 5 is a photograph of the stars projected on the screen according to the second comparative example. FIG. 6 is a photograph of the stars projected on the screen according to the first example.

In FIGS. 4 to 6, three stars (Alnitak, Alnilam, Mintaka) included in the projected Orion are enlarged and illustrated.

As illustrated in FIG. 4, in the screen according to the first comparative example, a peripheral portion of a lower left star and center portions of a central star and an upper right star are missing in a dot-like shape. Therefore, it can be confirmed that the stars projected at the positions of the holes are missing on the standard perforated dome screen that has been conventionally used.

Furthermore, as illustrated in FIG. 5, in the screen according to the second comparative example, a center portion of a lower left star and peripheral portions of a central star and an upper right star are largely missing. To easily confirm the absent state of the stars, it can be confirmed that the screen according to the second comparative example having the hole diameter larger than that of the screen according to the first comparative example causes the stars to be more significantly missing.

On the other hand, as illustrated in FIG. 6, the screen according to the first example obtained by bonding cloth to the screen according to the second comparative example does not make the stars be absent at all. This indicates that the screen according to the first example displays a portion of the star entered at the position of the hole on the surface of the cloth. Therefore, by boding the cloth to the aluminum punching panel, it can be confirmed that an effect against the missing stars can be obtained.

When the screens according to the second comparative example and the first example using the same aluminum punching panel are compared with each other, in the screen according to the second comparative example, 34% of the lower left star, 15% of the central star, and 12% of the upper left star are missing with respect to the screen according to the first example. Furthermore, in the screen according to the second comparative example, the magnitude of the lower left star is 2.3, the magnitude of the central star is 1.9, and the magnitude of the upper right star is 2.5. However, in the screen according to the first example, the magnitude of the lower left star is 1.9, the magnitude of the central star is 1.7, and the magnitude of the upper right star is 2.3. Therefore, it can be confirmed that the brightness of the star can be improved by preventing the generation of the missing part of the star by bonding the cloth to the aluminum punching panel.

In the following description, a difference between light transmission states of the screens according to the second comparative example and the first example will be further confirmed.

Figure 7:
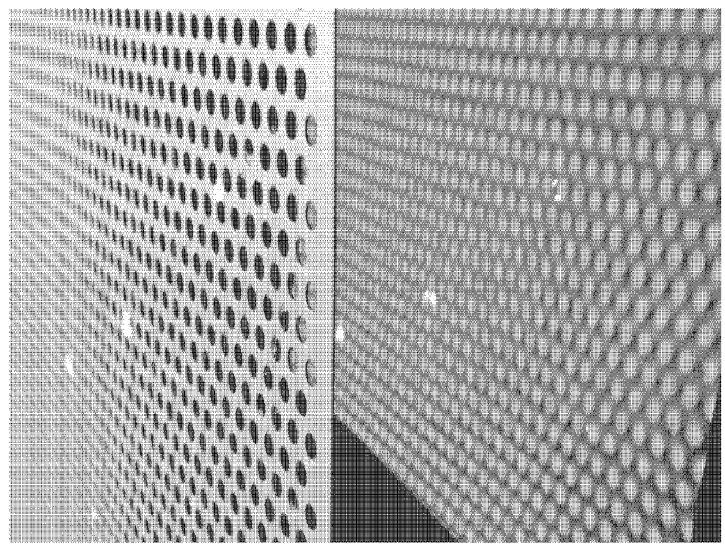
FIG. 7 is a photograph of a light transmission state of the screen according to the second comparative example.
Figure 8:
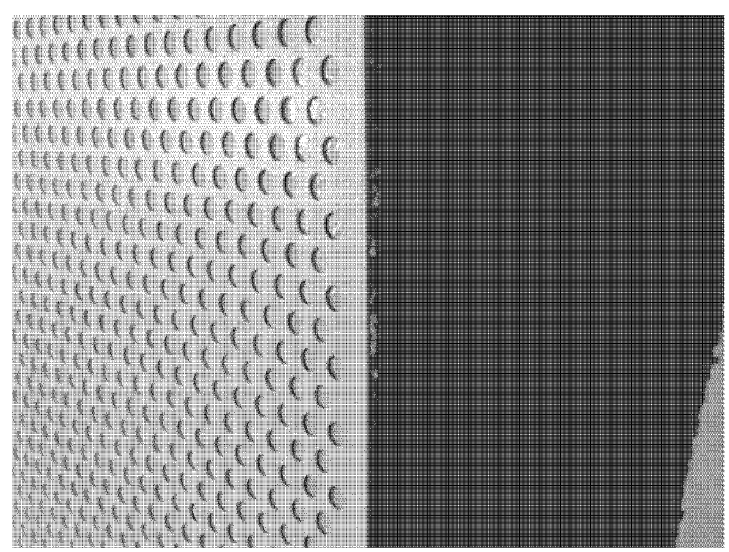
FIG. 8 is a photograph of a light transmission state of the screen according to the first example.

FIG. 7 is a photograph of the light transmission state of the screen according to the second comparative example. FIG. 8 is a photograph of the light transmission state of the screen according to the first example.

FIGS. 7 and 8 illustrate the light transmission states at the time when light is applied to each screen from the left side.

As illustrated in FIG. 7, the screen according to the second comparative example transmits light from the left to the right at the positions of the holes. When Orion is simultaneously projected on the screen according to the second comparative example, the screen has transmitted the stars projected at the positions of the holes to the right side. Therefore, it can be confirmed that the missing part of the star as illustrated in FIG. 5 has been caused by transmission of light toward the rear surface of the screen.

On the other hand, as illustrated in FIG. 8, the screen according to the first example reflects light that enters at the position other than the holes of the perforated screen on the perforated screen and reflects light that enters at the positions of the holes on the cloth. Therefore, it can be confirmed that the screen according to the first example can reflect the light of the image by the entire screen.

(Discussion of Aperture Ratio of Holes)

In the above example, it has been confirmed that the dome screen 10 can prevent the generation of the missing part of the star by bonding the cloth. On the other hand, by bonding the cloth, a loss of acoustic energy (sound transmission loss) that passes through the dome screen 10 from the outer side to the inner side increases. Therefore, the aperture ratio of the holes of the dome screen 10 has been discussed so as to reduce the sound transmission loss and efficiently makes the sound output by the speaker 40 installed on the outer side of the dome screen 10 pass through the dome screen 10 to the inner side. In particular, due to the directivity of the sound, the speaker that outputs sound in the high frequency band is often installed on the outer side of the dome screen 10. Therefore, the sound transmission loss in the high frequency band has been discussed as a particularly important factor.

To discuss the aperture ratio of the holes, four kinds of aluminum punching panels (a) to (d) having different aperture ratios have been prepared first. Specifications of each aluminum punching panel have been as indicated in Table 2 below. Then, to install each of the panels (a) to (d) in an acoustic tube for measuring a transmission loss to be described later, the panels have been cut into an appropriate size and have been prepared as third to sixth comparative examples. In addition, panels obtained by bonding polyester cloths to the cut panels (a) to (d) have been prepared as second to fifth examples. The third comparative example has the same specifications as the screen according to the first comparative example, the fifth comparative example has the same specifications as the screen according to the second comparative example, and the fourth example has the same specifications as the screen according to the first example.

TABLE 2

Specifications of aluminum punching panel

| Panel type | Aperture ratio of holes (%) | Panel thickness (mm) | Hole diameter (mm) | Hole pitch (mm) | With cloth | No cloth |
|---|---|---|---|---|---|---|
| (a) | 13 | 0.6 | 1.5 | 4 | Second example | Third comparative example |
| (b) | 23 | 1 | 1.55 | 3.05 | Third example | Fourth comparative example |
| (c) | 35 | 1 | 5 | 8 | Fourth example | Fifth comparative example |
| (d) | 51 | 1 | 3 | 4 | Fifth example | Sixth comparative example |

Subsequently, a vertical incident sound transmission loss of each example and each comparative example has been measured by using a method compliant with ASTM E2611.

Figure 9:
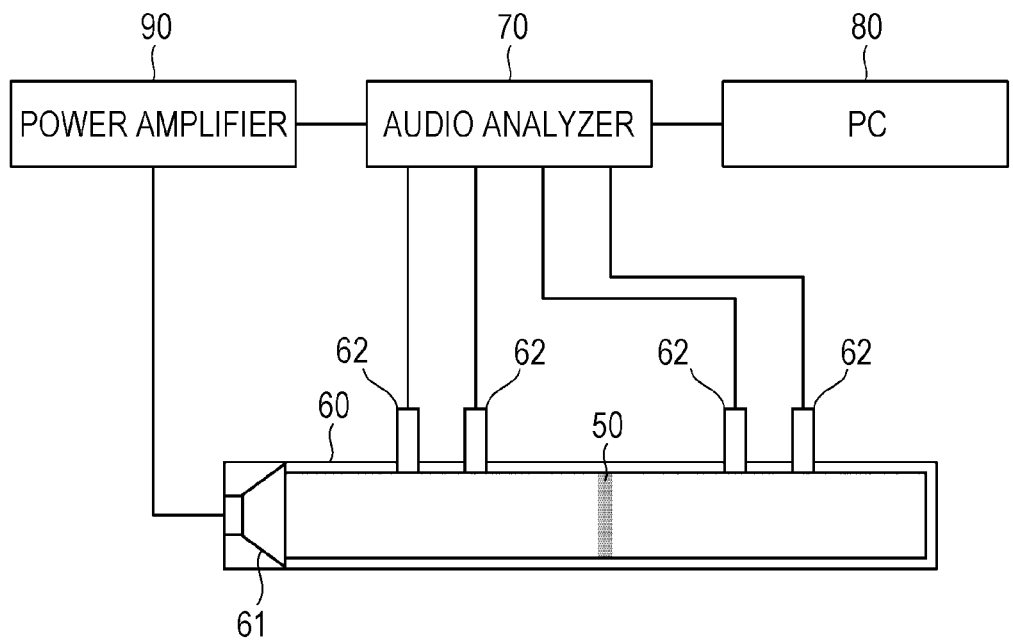
FIG. 9 is a schematic diagram of a transmission loss measuring system.

FIG. 9 is a schematic diagram of a transmission loss measuring system.

As illustrated in FIG. 9, each sample 50 prepared as each example and each comparative example has been installed in an acoustic tube 60 for measuring a transmission loss (Type 4206T manufactured by Brüel & Kjær). Then, a speaker 61 connected to the acoustic tube 60 has output sound by using an audio analyzer 70 (Type 3560B manufactured by Brüel & Kjær), dedicated software installed in a PC 80 (PULSE Labshop Type 7758 manufactured by Brüel & Kjær and the like), and a power amplifier 90. Then, a sound pressure level in the acoustic tube 60 has been measured by four microphones 62. The transmission losses of the second to fifth examples and the third to sixth comparative examples have been calculated based on the measurement results of the four microphones 62.

The measurement results of the sound transmission losses are indicated in Table 3 regarding the second to fifth examples and the third to sixth comparative examples. Table 3 indicates the results at the measurement frequencies f=1 kHz and 5 kHz.

TABLE 3

Measurement result of sound transmission loss

| | | Transmission loss (dB) | | | |
|---|---|---|---|---|---|
| | | Aperture ratio 13% | Aperture ratio 23% | Aperture ratio 35% | Aperture ratio 51% |
| Condition | No cloth f = 1 kHz | 0.41 (Third comparative example) | 0.35 (Fourth comparative example) | 0.30 (Fifth comparative example) | 0.19 (Sixth comparative example) |
| | With cloth f = 1 kHz | 7.33 (Second example) | 2.80 (Third example) | 1.96 (Fourth example) | 1.77 (Fifth example) |
| | No cloth f = 5 kHz | 2.33 (Third comparative example) | 1.72 (Fourth comparative example) | 1.52 (Fifth comparative example) | 0.80 (Sixth comparative example) |
| | With cloth f = 5 kHz | 11.92 (Second example) | 4.50 (Third example) | 3.14 (Fourth example) | 2.58 (Fifth example) |

Figure 10:
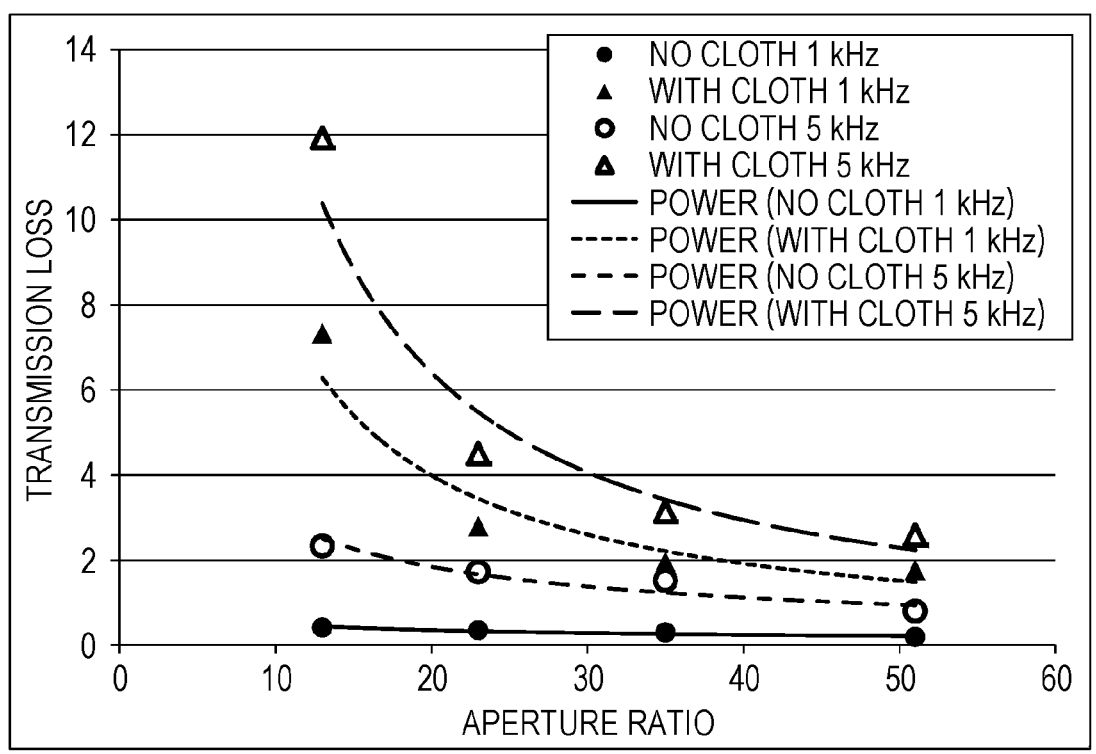
FIG. 10 is a diagram of a graph of a measurement result of a sound transmission loss indicated in Table 3.

FIG. 10 is a diagram of a graph of the measurement result of the sound transmission loss indicated in Table 3.

In FIG. 10, to easily observe the state of the change in the transmission loss based on the change in the aperture ratio, the results under the same condition of presence/absence of cloth and condition of the measurement frequency f (that is, conditions such as "no cloth, f=1 kHz" and "with cloth, f=5 kHz") are collectively indicated, and power approximate curves are also illustrated.

As indicated by the measurement results of the third to sixth comparative examples in Table 3 and FIG. 10, in a case of no cloth, at both measurement frequencies f=1 kHz and 5 kHz, the transmission loss has been decreased along with an increase in the aperture ratio.

In addition, as indicated by the measurement results of the second to fifth examples, even with cloth, at both measurement frequencies f=1 kHz and 5 kHz, the transmission loss has been decreased along with the increase in the aperture ratio. Therefore, it can be confirmed that acoustic characteristics are improved by increasing the aperture ratio.

Furthermore, in a case of no cloth, as indicated by the measurement results of the third comparative example, even with the small aperture ratio of 13%, the transmission loss at f=1 kHz is 0.41 dB, and the transmission loss at f=5 kHz is 2.33 dB. Acoustic characteristics that are excellent to some extent can be obtained.

However, when the cloth is bonded to prevent the absence of the stars, as indicated by the measurement results of the second example, with the small aperture ratio of 13%, the transmission loss at f=1 kHz is increased to 7.33 dB, and the transmission loss at f=5 kHz is increased to 11.92 dB. Therefore, in the present embodiment in which it is assumed to bond the cloth, it is necessary to increase the aperture ratio of the holes.

For example, to prevent the generation of the missing parts of the stars and secure the acoustic characteristics, for example, it is necessary to increase the aperture ratio of the holes from 13% to 35%. As a result, the transmission loss at f=1 kHz can be largely reduced from 7.33 dB to 1.96 dB, and the transmission loss at f=5 kHz can be largely reduced from 11.92 dB to 3.14 dB.

The aperture ratio of the holes may be selected based on a desired sound transmission loss of the dome screen 10. For example, by setting a threshold of the sound transmission loss at at least one frequency (for example, one kHz, five kHz, and the like), the aperture ratio of the holes with which the sound transmission loss equal to or less than a predetermined threshold can be achieved may be selected as the aperture ratio of the holes of the dome screen 10.

The threshold of the sound transmission loss may be set to an arbitrary value such as one dB, two dB, three dB, 4.5 dB, and six dB. In a case where the threshold of the sound transmission loss at f=1 kHz is set to two dB, with reference to Table 3, the aperture ratio equal to or more than 35% can achieve the sound transmission loss equal to or less than the threshold while bonding the cloth. In this case, as the aperture ratio of the holes of the dome screen 10, 35% may be selected. Furthermore, in a case where the thresholds of the sound transmission losses at f=1 kHz and 5 kHz are set to three dB, with reference to Table 3, the aperture ratio equal to or more than 51% can achieve the sound transmission loss equal to or less than the threshold. In this case, as the aperture ratio of the holes of the dome screen 10, 51% may be selected. Furthermore, in a case where the thresholds of the sound transmission losses at f=1 kHz and 5 kHz are set to 4.5 dB, with reference to Table 3, the aperture ratio equal to or more than 23% can achieve the sound transmission loss equal to or less than the threshold. In this case, as the aperture ratio of the holes of the dome screen 10, 23% may be selected.

In addition, the aperture ratio of the holes may be selected based on a continuous value as indicated by an approximate curve in FIG. 10 instead of a discrete value as indicated in Table 3. For example, in a case where the thresholds of the sound transmission losses at f=1 kHz and 5 kHz are set to three dB, with reference to the approximate curve illustrated in FIG. 10, it can be said that an aperture ratio of the holes equal to or more than about 40% can achieve the sound transmission loss equal to or less than the threshold. Therefore, the aperture ratio selected based on the continuous value indicated by the approximate curve is smaller than the aperture ratio of 51% that is selected based on the discrete value as indicated in Table 3, and it can be confirmed that it is not necessary to select an aperture ratio larger than necessary.

Furthermore, the aperture ratio of the holes may be selected based on a change rate of a desired sound transmission loss of the dome screen 10. For example, in a case of having the cloth, as illustrated in FIG. 10, the change in the transmission loss is significantly large between the aperture ratios of 13% and 23%, and the change in the transmission loss is small between the aperture ratios of 35% and 51%. Therefore, it can be confirmed that it is difficult to largely change the transmission loss even when the aperture ratio is set to be equal to or more than 35%. Therefore, by setting the change rate of the transmission loss as a threshold, the aperture ratio can be changed in a range in which the change rate equal to or more than the threshold can be realized, and the acoustic characteristics can be more effectively improved.

Furthermore, the aperture ratio of the holes may be selected based on an acoustic transmittance instead of the sound transmission loss. A sound transmission loss TL and an acoustic transmittance τ that is a transmittance of acoustic energy have the following relation.

$$TL = 10\log_{10}\frac{1}{\tau} \quad \text{[Expression 1]}$$

Therefore, for example, the threshold of the acoustic transmittance may be set to an arbitrary value such as 80%, 70%, 60%, and 50%, and the aperture ratio of the holes that can achieve the acoustic transmittance equal to or more than the threshold may be selected as the aperture ratio of the holes of the dome screen 10.

After the aperture ratio has been determined, the hole diameter and the hole pitch may be determined based on the determined aperture ratio. For example, in a case where the holes are arranged in a triangle lattice pattern, an aperture ratio R, a hole diameter D, and a hole pitch P have the following relation.

$$R = \frac{90.6 \times D^2}{P^2} \quad \text{[Expression 2]}$$

As described above, the range of the hole diameter D may be determined based on the anticipated angle α and the like. Therefore, by substituting a value of the aperture ratio determined from desired acoustic characteristics into the aperture ratio R, the range of the hole pitch P may be determined. As described above, by discussing both the hole diameter and the aperture ratio of the holes, the ranges of the parameters to realize the effect of the dome screen 10 may be sequentially determined.

Furthermore, the aperture ratio of the holes and the material of the sheet portion 12 may be examined based on the desired sound transmission loss of the dome screen 10. By selecting a material that having a high acoustic transmittance while securing a desired light reflectance as the sheet portion 12, the sound transmission loss can be further reduced, and the acoustic characteristics can be further improved.

The present application is based on Japanese Patent Application No. 2016-231782 filed on Nov. 29, 2016, and the disclosure content thereof is incorporated by reference in its entirety.

REFERENCE SIGNS LIST

1 dome screen projection facility
10 dome screen
11 dome portion
12 sheet portion
20 support frame
30 projector
40 speaker

The invention claimed is:

1. A dome screen capable of projecting an image, the dome screen comprising:
   a dome portion having a plurality of holes, having light reflectivity, formed in a hemispherical shape; and
   a sheet portion arranged on an outer side of the dome portion so as to overlap with the dome portion and having light reflectivity.

2. The dome screen according to claim 1, wherein
   an aperture ratio of the plurality of holes is selected so that a sound transmission loss indicating a loss of acoustic energy passing through the dome screen from an outer side to an inner side is equal to or less than a predetermined threshold.

3. The dome screen according to claim 2, wherein
   a ratio between a hole diameter of each of the plurality of holes and a thickness of the dome portion is selected so that a portion equal to or more than a predetermined proportion of an image projected on the sheet portion positioned on a bottom surface of the hole can be seen.

4. The dome screen according to claim 2, wherein
   a hole diameter of each of the plurality of holes is selected so that the portion equal to or more than a predetermined proportion of the image projected on the sheet portion positioned on a bottom surface of the hole can be seen.

5. The dome screen according to claim 1, wherein
   an aperture ratio of the plurality of holes and a material of the sheet portion are selected so that a sound transmission loss indicating a loss of acoustic energy passing through the dome screen from an outer side to an inner side is equal to or less than a predetermined threshold.

6. The dome screen according to claim 5, wherein
   a ratio between a hole diameter of each of the plurality of holes and a thickness of the dome portion is selected so that a portion equal to or more than a predetermined proportion of an image projected on the sheet portion positioned on a bottom surface of the hole can be seen.

7. The dome screen according to claim 5, wherein
   a hole diameter of each of the plurality of holes is selected so that the portion equal to or more than a predetermined proportion of the image projected on the sheet portion positioned on a bottom surface of the hole can be seen.

8. The dome screen according to claim 1, wherein
   a ratio between a hole diameter of each of the plurality of holes and a thickness of the dome portion is selected so that a portion equal to or more than a predetermined proportion of an image projected on the sheet portion positioned on a bottom surface of the hole can be seen.

9. The dome screen according to claim 8, wherein
   a hole diameter of each of the plurality of holes is selected so that the portion equal to or more than a predetermined proportion of the image projected on the sheet portion positioned on a bottom surface of the hole can be seen.

10. The dome screen according to claim 1, wherein
    a hole diameter of each of the plurality of holes is selected so that the portion equal to or more than a predetermined proportion of the image projected on the sheet portion positioned on a bottom surface of the hole can be seen.

11. The dome screen according to claim 10, wherein
    an interval between the plurality of holes is determined based on the aperture ratio and the hole diameter selected so that the sound transmission loss indicating the loss of the acoustic energy passing through the dome screen from the outer side to the inner side is equal to or less than the predetermined threshold.

12. The dome screen according to claim 1, wherein
    a light reflectance of the dome portion and a light reflectance of the sheet portion are equal to or more than 30%.

13. A projection facility comprising:
    a dome screen capable of projecting an image;
    a projector that projects an image on the dome screen; and
    a plurality of speakers arranged on an outer side of the dome screen, wherein
    the dome screen includes:
    a dome portion having a plurality of holes, having light reflectivity, formed in a hemispherical shape; and
    a sheet portion arranged on an outer side of the dome portion so as to overlap with the dome portion and having light reflectivity.

14. The projection facility according to claim 13, wherein
    an aperture ratio of the plurality of holes is selected so that a sound transmission loss indicating a loss of acoustic energy passing through the dome screen from an outer side to an inner side is equal to or less than a predetermined threshold.

15. The projection facility according to claim 13, wherein
    an aperture ratio of the plurality of holes and a material of the sheet portion are selected so that a sound transmission loss indicating a loss of acoustic energy passing through the dome screen from an outer side to an inner side is equal to or less than a predetermined threshold.

16. The projection facility according to claim 13, wherein
    a ratio between a hole diameter of each of the plurality of holes and a thickness of the dome portion is selected so that a portion equal to or more than a predetermined proportion of an image projected on the sheet portion positioned on a bottom surface of the hole can be seen.

17. The projection facility according to claim 13, wherein
    a hole diameter of each of the plurality of holes is selected so that the portion equal to or more than a predetermined proportion of the image projected on the sheet portion positioned on a bottom surface of the hole can be seen.

18. The projection facility according to claim 13, wherein
an interval between the plurality of holes is determined based on the aperture ratio and the hole diameter selected so that the sound transmission loss indicating the loss of the acoustic energy passing through the dome screen from the outer side to the inner side is equal to or less than the predetermined threshold.

19. The projection facility according to claim 13, wherein
a light reflectance of the dome portion and a light reflectance of the sheet portion are equal to or more than 30%.

* * * * *